Sept. 13, 1932.  S. Q. LEE  1,877,137
METHOD OF PROGRESSIVELY BLOATING EARTHY MATERIALS
Filed July 14, 1930
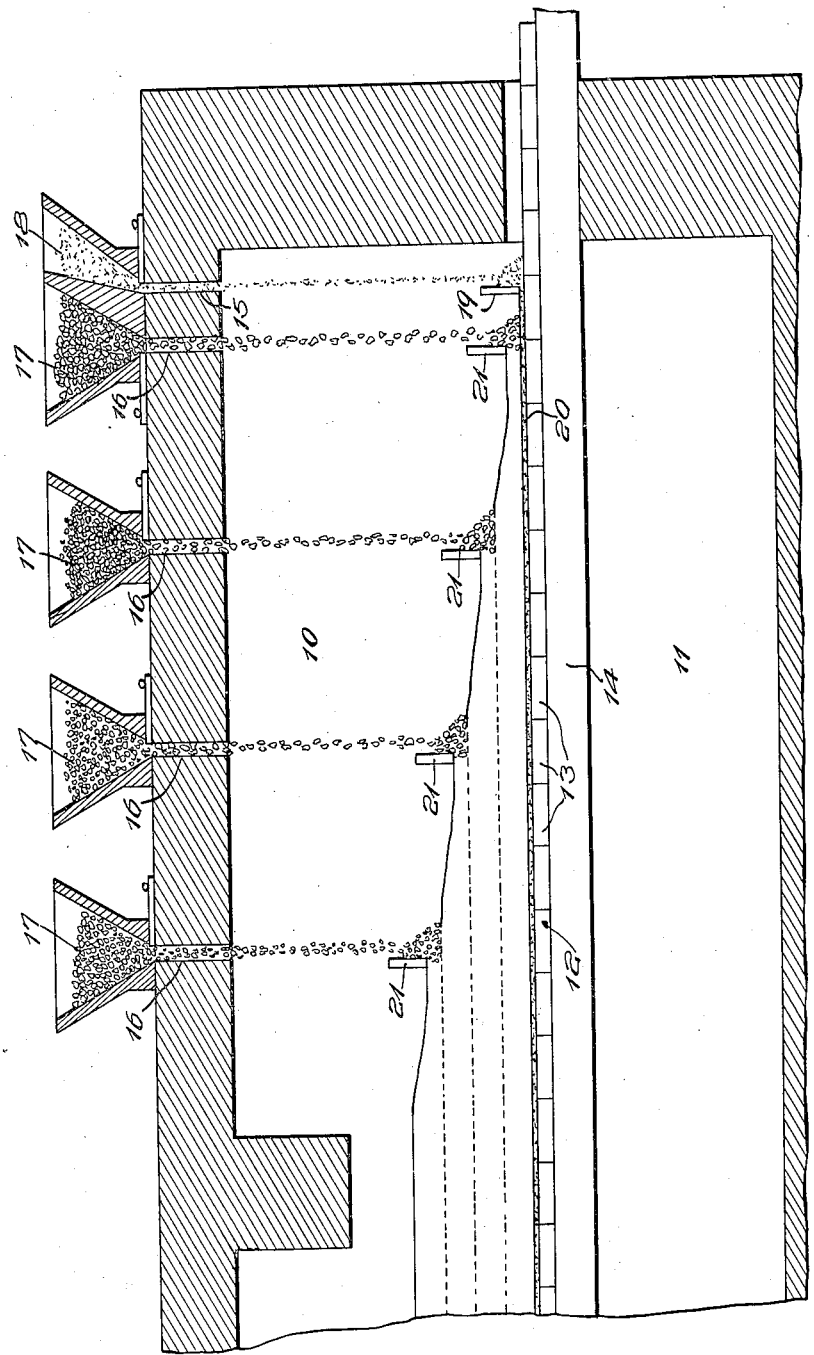
Witness
William P. Kilroy
Inventor:
Sherman Q. Lee
By Samuel W. Banning
Atty.

Patented Sept. 13, 1932

1,877,137

UNITED STATES PATENT OFFICE

SHERMAN Q. LEE, OF MADISON, WISCONSIN, ASSIGNOR, BY MESNE ASSIGNMENTS, TO AMERICAN FACE BRICK RESEARCH CORPORATION, A CORPORATION OF ILLINOIS

METHOD OF PROGRESSIVELY BLOATING EARTHY MATERIALS

Application filed July 14, 1930. Serial No. 467,994.

This invention relates to method of progressively bloating earthy materials.

This invention has reference to a method of progressively bloating a continuous slab or column of earthy material, such as clay or other argillaceous materials in granular form, by the continuous delivery of small accretions of said granular materials, so that the slab or column is being continuously and progressively built up within the bloating chamber and continuously fed forward and emerging from the bloating chamber for further annealing treatment.

The method of the present invention differs from others with which I am familiar, in that the column is being built up in comparatively thin layers by small and continuously deposited accretions which during the bloating stage become completely fused together into a continuous homogeneous slab of bloated cellular material. By the present process, the bloating heat is applied to comparatively thin layers or deposits in the form of accretions as distinguished from relatively deep layers which, according to other methods, are bloated as units and discharged after bloating either in unit form or in the form of a continuous column made up of individually bloated units fused or welded together.

In carrying out the method of the present invention, I prefer to feed relatively thin layers of granular material upon the surface of a continuously moving hearth and to deliver additional layers upon the surface of the layer or layers first deposited, so that as the lowermost layer or layers advance rearwardly through the bloating chamber and are bloated, they will progressively receive additional deposits upon the surface, thereby building up the thickness of the column by progressively deposited accretions forming superposed layers, with the newly deposited material being continually acted upon by the bloating temperature from above, so that the first deposited layer or layers, after bloating, will be insulated and protected against the unduly prolonged effect of a bloating temperature by the deposit of new layers of granular material from above. In this way each relatively thin layer of granular material will be uniformly subjected throughout to the effects of the bloating temperature, thereby establishing a greater uniformity in the structure of the completed column and at the same time permitting a column of greater thickness to be produced than would otherwise be possible.

In order to better illustrate the method of the present invention, reference is had to the accompanying drawing, which constitutes a diagrammatic sectional elevation of a kiln operating in accordance with the principles of the present invention.

The kiln comprises an upper combustion and bloating chamber 10 and a lower combustion chamber 11. The bloating chamber under usual conditions will be maintained at a bloating temperature of approximately 2200° F., at which temperature the particles of granular material fuse and coalesce and bloat and expand by the generation of gases within the mass, which results in the production of a bloated cellular product having vitrified cell walls. The lower combustion chamber will be maintained at what may be termed a soaking temperature, which will ordinarily be from 2000° F. to 2050° F., which is a temperature intermediate the bloating temperature and the congealing temperature, and one which serves to maintain the bloated material in a slightly plastic state, without, however, promoting additional bloating of the mass, although the bloating and soaking temperatures may be varied to suit the requirements of different clays as well as in ratio to the times allowed for bloating and soaking and other factors conditioning the desired character of the resulting product.

The upper and lower chambers are separated by means of a movable hearth 12 which, as shown, is in the form of a plurality of contacting slabs 13, the ends of which rest upon rails 14, so that the hearth as a whole may be moved forward by pressure from the rear and thus constitute a continuous conveyor, adapted to be moved at a slow or uniform speed of advance through the bloating chamber. Although the hearth may be made of refractory earthy materials, it is preferred to construct the hearth, and the rails along which it travels, of heat resisting steel which will not deteriorate under temperatures up to 2200° F. for a period of time sufficient to make them economically practical. As an example of such a steel, the Crucible Steel Company of America's Rezistal #7 has withstood 2200° F. for 300 hours without appreciable deterioration.

The roof of the bloating chamber is provided, at a point near the forward end, with a duct 15 for the discharge of sand or other parting material upon the surface of the movable hearth, and the roof is further provided, at equally spaced recurrent intervals, with ducts 16 for the progressive discharge of layers of granular material. The granular material is preferably preheated and deposited within hoppers 17, although it will of course be understood that the method of preheating and supplying the granular material forms no portion of the present invention, and that the illustration given serves merely as a diagrammatic representation of the principles involved. Sand or other parting material is contained within a hopper 18.

Immediately below the mouth of the sand discharge duct 15, and at a slight elevation above the surface of the traveling hearth, is a transversely extending scraper 19, which is located slightly to the rear of the point where the sand, falling by gravity, is deposited upon the traveling surface of the hearth, so that the sand deposited at this point will be scraped down and distributed in the form of a thin layer 20 across the surface of the hearth to prevent adherence of the earthy material thereto when in fused and bloating condition.

Each of the ducts 16 likewise discharges granular earthy material at a point immediately in advance of a scraper 21, and it will be observed that the scrapers are progressively elevated by equal stages above the surface of the hearth, the lower edge of each scraper being set at an elevation which equals the aggregate height of the sand layer and the mass previously deposited and bloated, with additional space equal to the intended depth of the layer of granular material being spread out and leveled down by the scraper in question. This gives to the scrapers from front to rear a progressively stepped relationship, and after the deposit of the first layer of granular material, which rests upon the bed of sand or other parting material, the succeeding accretions of granular material will be deposited upon and spread out over the surface of the underlying bloated layer, so that as the column is built up and slowly and progressively travels toward the rear of the kiln, a sloping or stepped surface of newly deposited unbloated granular material will be presented throughout to the bloating temperature above, while the superposed underlying layers of material will be insulated from the bloating temperature and will slightly cool down to the soaking temperature maintained upon the hearth by the combustion in the lower chamber 11. In this way no portion of the mass will become over bloated or unduly expanded, and at the same time a soaking heat will be conserved and maintained throughout the mass, which in a measure obviates the necessity for subjecting the completed column for a long period of time to a soaking temperature after its emergence from the bloating chamber.

Furthermore, the newly charged relatively thin layers will fall directly upon the surface of the underlying bloating mass, so that the new charges will become quickly fused and coalesced with the previously bloated layers, thereby causing complete coalescence of the materials, so that joints or laminations in the completed slab or column will be completely eliminated, and by the time it emerges from the bloating chamber it will be in the form of a homogeneously amalgamated mass of cellular formation and of substantially uniform structure throughout.

Furthermore, by spreading the material in the form of relatively thin layers, a more uniform bloating is possible, since the heat will be more quickly and evenly distributed throughout the mass, which avoids the production of large pockets or cavities at recurrent intervals, which frequently occur where layers of relatively thick depth are subjected to a bloating temperature, and where the surface portions of the mass will frequently become over-bloated before the heat has sufficiently penetrated to the interior to cause adequate bloating thereof. The uniformity in structure throughout tends to minimize interior strains set up during the annealing and cooling operations, which are eccentuated in bloated masses having varying densities throughout, since different densities possess different thermal expansions, which it is difficult to deal with in the annealing and cooling operations. Furthermore, the product of the present process is less likely to contain permanent strains, and is correspondingly stronger and better adapted to building requirements.

The process of the present invention is adapted for the production of slabs or columns of almost indefinite thickness, since the number of layers deposited during the bloating operation may be increased or diminished to any desired extent, and the thickness of the layers may be regulated as desired, and these factors, together with the bloating temperature maintained and the speed of travel of the mass through the bloating chamber, may be varied, so that the cellular character of the resulting product can be regulated to any extent desired. This permits of the production of products of varying density and varying strength, and enables a uniform product having the characteristics desired to be continuously produced without material variation in quality throughout. At the same time the method is one which tends to conserve heat and to insure compactness in the kiln, since the soaking of the material is in part performed within the bloating chamber itself, and before the column emerges therefrom into a soaking zone, where a soaking temperature is maintained on both top and bottom of the slab or column for the period of time required to permit the dissipation of all internal strains or stresses.

I claim:

1. The method of producing a continuous slab of bloated earthy material, which consists in subjecting a first layer of granular earthy material to a bloating temperature to cause bloating thereof, and in thereafter depositing a second layer of granular earthy material upon the first layer and subjecting the second layer to a bloating temperature to cause bloating thereof and adherence to the first bloated layer in the production of a bloated slab of progressively increasing thickness.

2. The method of producing a continuous slab of bloated earthy material, which consists in depositing and leveling down a first layer of granular earthy material and in subjecting the same in leveled off condition to a bloating temperature to produce bloating thereof, and in thereafter depositing a second layer of granular earthy material upon the first layer and in leveling down the second layer and subjecting the same to a bloating temperature to cause adherence to the first layer and to cause bloating of the second layer in the production of a bloated slab of progressively increasing thickness.

3. The method of producing a continuous slab of bloated earthy material, which consists in depositing and leveling down a first layer of granular earthy material and subjecting the same to a bloating temperature to cause bloating thereof, and in depositing and leveling down a second layer of granular earthy material at a higher elevation than the level of the first layer when bloated and upon the upper surface of the bloated first layer, and in subjecting the second layer to a bloating temperature to cause bloating of the second layer and fusion thereof with the first bloated layer.

4. The method of producing a continuous slab of bloated earthy material, which consists in depositing granular earthy material and in gauging the same to a layer of uniform depth during advancement, and in subjecting the gauged layer to a bloating temperature to cause bloating thereof, and in depositing upon the bloated first layer at a farther stage in its advancement a second charge of granular earthy material and in gauging down said second charge to a layer of uniform depth upon the surface of the bloated first layer during advancement of the superposed layers and in subjecting the second layer to a bloating temperature to cause bloating thereof and fusion with the first layer, and in thereafter advancing the combined mass beyond the bloating zone.

5. The method of producing a continuous slab of bloated material, which consists in continuously feeding granular earthy material and in continuously advancing the material thus fed, and gauging down the same to the form of a continuously accreting layer of substantially uniform depth, subjecting the continuously forming and advancing layer to a bloating temperature to cause bloating thereof, and in continuously discharging a second charge of granular material at a point farther advanced than the point of discharge for the first charge, and upon the surface of the previously bloated first layer, and gauging down the second charge into the form of a continuously advancing and continuously accreting second layer of granular earthy material, and in subjecting the second layer to a bloating temperature to cause bloating thereof and fusion with the first bloated layer and in discharging the mass from the bloating zone.

6. The method of producing bloated material, which consists in depositing granular earthy material in the form of a layer, and in subjecting one side of the layer to a bloating temperature and in subjecting the other side of the layer to an annealing temperature of lower degree than the bloating temperature.

7. The method of producing bloated material, which consists in depositing a first charge of granular earthy material in the form of a layer, subjecting one side of said layer to a bloating temperature to cause bloating thereof, depositing a second charge of granular earthy material in the form of a layer upon the previously bloated first charge and subjecting the second charge to a bloating temperature, and in maintaining an annealing temperature below the bloating temperature on the opposite side of the first layer to cause progressive annealing on one side concurrently with progressive bloating on the other side of the mass.

8. The method of producing a continuous slab of bloated material, which consists in depositing and continuously advancing a first charge of granular earthy material and in gauging down the same during advancement to produce a layer of uniform depth, subjecting the upper surface of said layer to a bloating temperature to cause bloating thereof, depositing a second charge of granular earthy material upon the surface of the first bloated charge and gauging down the second charge to produce a second layer of uniform depth upon the first layer, subjecting the second layer to a bloating temperature to cause bloating thereof and fusion with the first layer, and in maintaining an annealing temperature of lower degree than the bloating temperature beneath the first layer.

9. The method of producing a continuous slab of bloated material, which consists in continuously discharging a plurality of streams of granular earthy material at recurrent positions throughout a bloating zone maintained at a bloating temperature, and in continuously advancing and leveling down said charges to present the form of a plurality of progressively superposed layers of granular material, each layer being successively deposited and spread upon a previously deposited and bloated layer to produce a slab of progressively increasing thickness, and in advancing the layers continuously through the bloating zone to the point of discharge.

10. The method of producing a continuous slab of bloated material, which consists in continuously discharging a plurality of streams of granular earthy material at recurrent positions throughout a bloating zone maintained at a bloating temperature, and in continuously advancing and leveling down said charges to present the form of a plurality of progressively superposed layers of granular material, each layer being successively deposited and spread upon a previously deposited and bloated layer to produce a slab of progressively increasing thickness, and in advancing the layers continuously through the bloating zone to the point of discharge, and in subjecting the layered mass from beneath to an annealing temperature of less degree than the bloating temperature.

In witness that I claim the foregoing I have hereunto subscribed my name this 30th day of June, 1930.

SHERMAN Q. LEE.